UNITED STATES PATENT OFFICE.

PIERRE DE P. RICKETTS, OF NEW YORK, N. Y.

PROCESS OF ELECTROLYTIC SEPARATION OF NICKEL FROM COPPER.

SPECIFICATION forming part of Letters Patent No. 514,276, dated February 6, 1894.

Original application filed April 20, 1892, Serial No. 429,925. Divided and this application filed May 15, 1893. Serial No. 474,331.

(No specimens.)

*To all whom it may concern:*

Be it known that I, PIERRE DE P. RICKETTS, a citizen of the United States, and a resident of the city, county, and State of New York, have invented certain new and useful Improvements in Processes of Separating Metallic Nickel, Nickel Salts, or Nickel Oxides from Copper or other Metals, of which the following is a specification.

My invention relates to an improvement in processes of separating metallic nickel, nickel salts or nickel oxides, from copper and other metals, and the various impurities with which the nickeliferous bodies above named may be combined, and also for producing metallic nickel, oxides of nickel and salts of nickel, from nickel compounds or alloys.

The precise object of the invention is the production, and separation of the aforesaid nickeliferous products, by electricity, from the alloys and other bodies containing nickel, and I accomplish this in the manner hereinafter described.

When nickeliferous bodies are dissolved in any convenient acid that will dissolve the same, so as to form a solution of the copper, nickel and other metals contained therein, and alkalies or sulphates of any alkaline base or ammonia or mixture of such salts are added to the solution in such quantities as not to interfere with the acid reaction, the nickel contained in the solution will form double sulphates of nickel and the particular alkaline base present in the salt used. This double sulphate of nickel and the alkaline base is practically insoluble in the acid solution and is precipitated to the bottom. If now an electric current be passed through the solution from suitable terminals within the same, either before or after the addition of the alkaline reagents, the copper will be deposited upon the negative terminal and may be readily removed from the solution, while the insoluble nickel salts will be left as a precipitate at the bottom and may then be removed as they accumulate, and the nickel obtained from them in any manner.

In an application heretofore filed by me in the Patent Office, Serial No. 429,925, of which the present is a division, I have described a similar process of separation, in which the nickeliferous bodies are immersed in a bath for the purpose of separating the nickel, and to which bath certain reagents are added, through which an acid reaction is maintained in the bath and whereby a continuous process of separation is effected. The present application contemplates a process in which the nickeliferous bodies are first dissolved in any suitable acid, and then, if necessary, concentrated in solution, the acid reaction being maintained, and the separation effected preferably by the subsequent addition of the desired reagents in connection with the electric current as hereinafter described.

The various nickeliferous bodies which are to be subjected to the treatment are first prepared or concentrated in any desired manner, so as to be freed from an excess of impurities, either with or without the addition of an electric current and are then dissolved in any one of the same acids as those employed in the aforesaid process, namely, sulphuric or other convenient acid, and if desired are further concentrated in the solution. The acid employed for this purpose is preferably sulphuric acid, and, if desired, the nickeliferous ores, mattes, &c., may be first roasted in any convenient manner before solution. To this solution of the nickeliferous bodies reagents are added similar to those used in the bath in the aforesaid application, namely, sulphate of ammonia or any sulphate of any alkaline base, either as such or by adding caustic alkali to the solution. The quantity of the caustic alkali or salt of the alkaline base employed, to be thus added, will depend upon and vary with the character of these ingredients. By the addition of these reagents to the solution, a bath is formed and the same conditions produced as exist in the bath described in the aforesaid application. It is essential, however, that the bath should be distinctively acid in its reaction, and not alkaline, and hence only such quantities of the alkalies or their salts should be added as will not interfere with the acid reaction of the bath.

The solution may be effected in any convenient form of vessel, and if desired, a convenient amount of water may be added, preferably at a temperature slightly below its boiling point.

The electric current for the removal of the copper may be passed through the bath, before or after the addition of the above mentioned reagents, but it may be found preferable to introduce it after the addition of the latter. The electric current is then passed into the bath from a suitable positive terminal composed of plates of copper, zinc or iron or any other form of terminal which will readily allow the current to pass from it to the solution in the bath to one or more suitable negative terminals placed therein.

The electric current will decompose the bath and the copper will be deposited on the cathode, the nickel salts will be precipitated to the bottom of the bath, and, being practically insoluble in the acid solution will accumulate on the bottom. The iron and other impurities generally present will dissolve, or remain in solution, or will collect with the nickel compounds at the bottom of the bath.

The solution of the bath may be renewed from time to time by the addition of fresh nickeliferous solution and salts of alkaline bases as may seem necessary, to maintain in the bath the desired acid reaction, and to remove fresh portions of nickel and copper from the bath continually. The copper deposited in the cathode will also be removed from time to time as it accumulates, and be subsequently refined in any convenient manner, while the nickel salts are collected as sediment in the bottom of the bath, and although insoluble in acid solution, may be dissolved in water, and thus separated from any insoluble impurities, such as sulphur, contained therein. The solution is then evaporated to dryness and treated in a retort, thus yielding up the ammoniacal compounds contained therein, in case ammonia salts are employed, which are then condensed and used for preparing the bath for new treatment. The residuum left in the retort after distillation will, if the process be correctly carried out and a sufficient degree of heat employed, be found to consist of nearly commercially pure oxide of nickel (together with any fixed alkalies employed, such as soda or potash), which can be reduced to metallic nickel in any convenient manner,—as, for example, by mixing it with carbonaceous material and heating in crucibles or furnaces adapted for that purpose.

If desired, the solution of ammoniacal nickel salts obtained from dissolving in water the precipitate formed by the electrolytic action of the electric current, may be purified by recrystallization, for the production of nickel salts for electroplating purposes; or they may be treated electrolytically for the production of metallic nickel, by any of the ordinary electrolytic methods.

The invention is not necessarily limited to the use of a bath of sulphuric acid, for the reason that any acid may be employed that will unite with ammonia, soda or potash, to form an insoluble double salt of nickel and the alkaline base. Nor is the invention necessarily limited to the use of sulphates of ammonia or the alkaline bases for caustic alkalies, and any other salts of the alkalies may be employed, that will unite with the acid in the bath to form a salt, which, in the presence of nickel, will form an insoluble double sulphate of nickel and the alkaline base present therein.

I claim as my invention—

1. The method of separating nickel contained in nickeliferous bodies, from the other metals, salts of metals and impurities combined therewith, consisting in immersing and dissolving the nickeliferous bodies in suitable acids, in adding to the solution alkalies, sulphates of alkaline bases or other similar reagents in quantities sufficient to form an acid bath of such composition as to retain the copper in solution and form with the nickel insoluble salts; and causing an electric current to traverse the bath from an anode, to a suitable cathode placed therein, whereby the copper is deposited upon the cathode and the nickel salts precipitated to the bottom of the bath.

2. The method of separating nickel contained in nickeliferous bodies, from the other metals, salts of metals and impurities combined therewith, consisting in immersing and dissolving the nickeliferous bodies in acids; in adding to the solution alkalies, sulphates of alkaline bases or other similar reagents in quantities sufficient to form an acid bath of such composition as to dissolve the copper and nickel and retain the former in solution and form with the latter insoluble salts; in causing an electric current to traverse the bath, from an anode to a suitable cathode, whereby the copper is deposited on the cathode and the insoluble nickel salts precipitated; in collecting the precipitated salts, dissolving the same in water and separating the insoluble impurities therein; in evaporating the solution to dryness and heating the residue in a retort, whereby the ammoniacal products, if any, are collected and saved; and in refining the nickel residue in any convenient manner.

3. The method of separating nickel contained in nickeliferous bodies from the other metals and impurities combined therewith, consisting in immersing and dissolving the nickeliferous bodies in suitable acids; in adding thereto sulphates of ammonia or other similar ammoniacal salts, so as to form and retain a bath having an acid reaction of such composition as to dissolve the copper and nickel and retain the former in solution and form with the latter insoluble salts; and in causing an electric current to traverse the bath continuously from a suitable positive terminal to a suitable cathode, placed therein, whereby the copper is deposited upon the cathode and the nickel salts are precipitated to the bottom of the bath; in collecting the precipitated salts and dissolving the same in water, separating the insoluble impurities contained therein; evaporating the solution to dryness and heating the residue in a retort, whereby the ammoniacal products are collected and condensed for further use, and the nickel residue refined in any convenient manner.

4. The method of separating nickel from copper and other metals and impurities contained in nickeliferous bodies, consisting in immersing and dissolving the same in sulphuric acid, in adding thereto sulphates of alkaline bases or other similar salts of alkalies, in such quantities as to form a bath having an acid reaction of such composition as to dissolve the copper and nickel and retain the former in solution and form with the latter insoluble salts; and in causing an electric current to traverse the bath from an anode to a suitable cathode, placed therein, whereby the copper is deposited in metallic form upon the cathode, and the nickel compounds are precipitated in the form of salts; and in converting these salts into metallic nickel, by first converting into oxide of nickel by solution and precipitation and subsequent evaporation in a retort, and then reducing the oxide of nickel to metallic nickel by heating with carboniferous material in a suitable furnace.

5. The method of separating nickel from the other metals, salts of metals and impurities combined therewith in nickeliferous bodies, consisting in purifying and concentrating when necessary; in forming the purified mass into suitable plates or shapes; in immersing the plates or shapes in acids in adding thereto alkalies, sulphates of alkaline bases or other similar reagents from time to time in quantities sufficient to form a bath having a continuing acid reaction of such composition as to dissolve the copper and nickel and retain the former in solution and form with the latter insoluble salts; and in causing an electric current to traverse the bath continuously from an anode to a suitable cathode, placed therein, whereby the copper, as soon as dissolved is continuously deposited upon the cathode and the insoluble nickel salts precipitated to the bottom and are afterward removed and subjected to further treatment.

In testimony that I claim the foregoing as my invention I have signed my name, in presence of two witnesses, this 25th day of March, 1893.

PIERRE DE P. RICKETTS.

Witnesses:
  WILLARD PARKER BUTLER,
  EDWIN T. RICE, Sr.